UNITED STATES PATENT OFFICE.

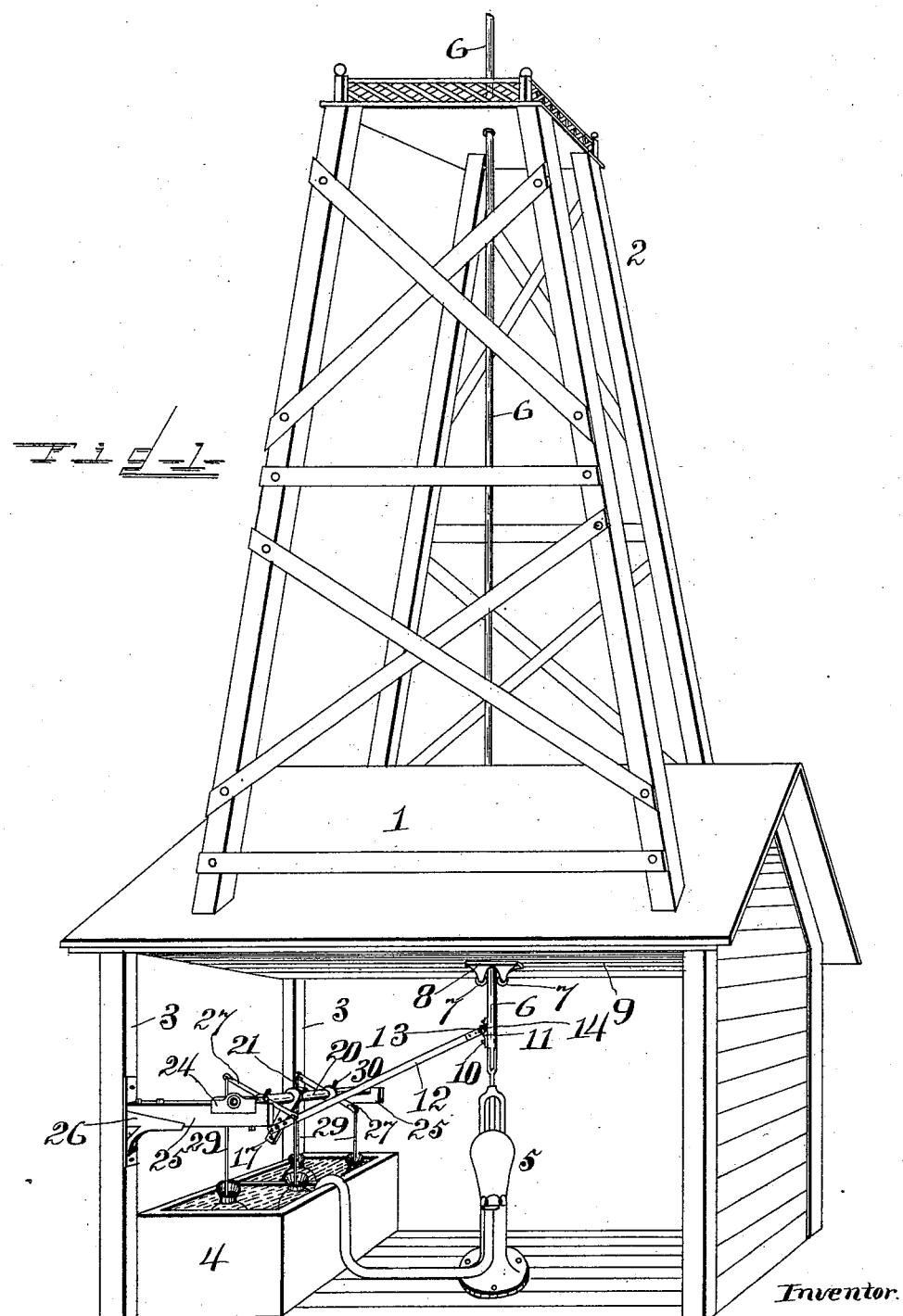

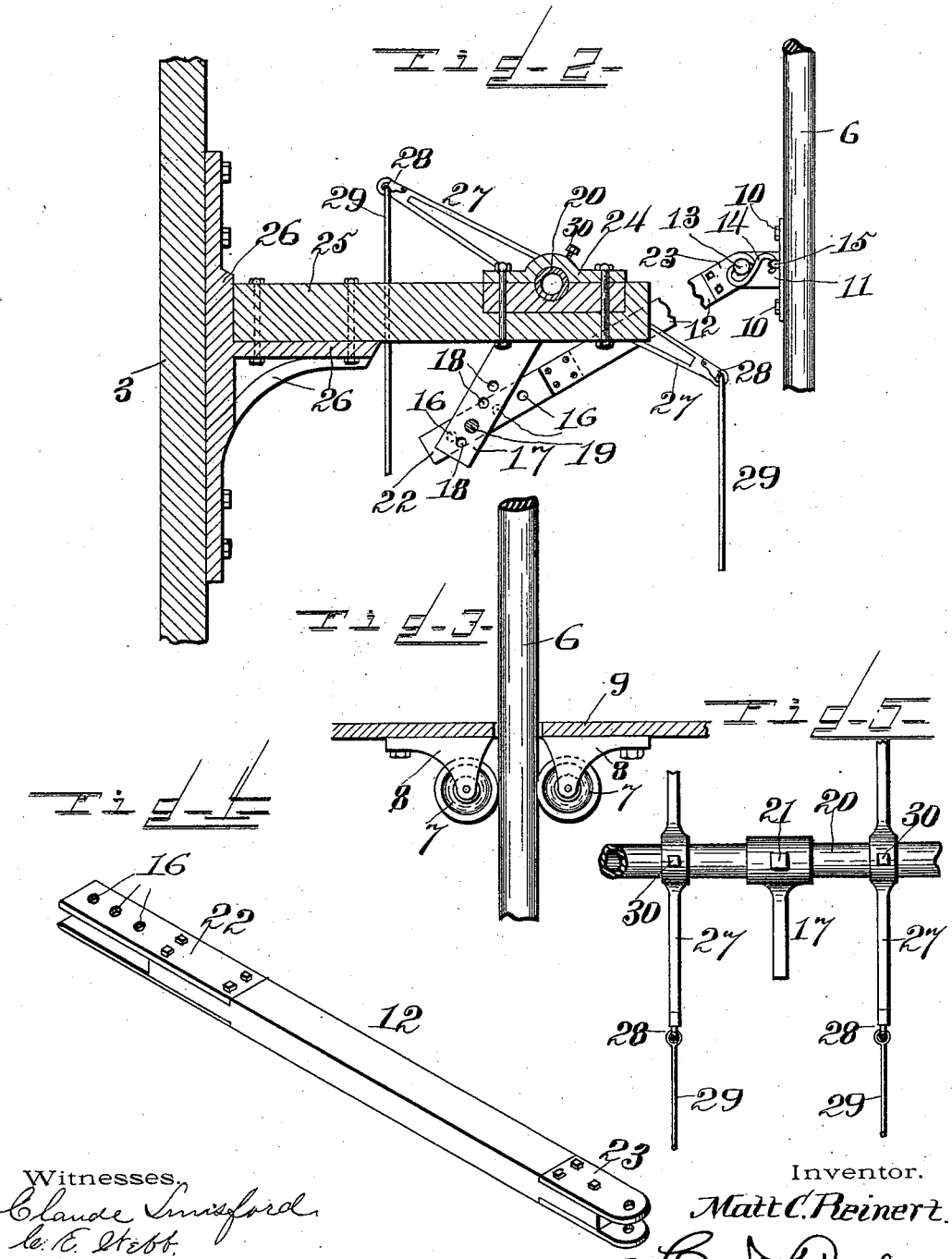

MATT C. REINERT, OF ST. CHARLES, ILLINOIS.

MILK-COOLER.

SPECIFICATION forming part of Letters Patent No. 539,705, dated May 21, 1895.

Application filed February 27, 1895. Serial No. 539,923. (No model.)

*To all whom it may concern:*

Be it known that I, MATT C. REINERT, a citizen of the United States, residing at St. Charles, in the county of Kane and State of Illinois, have invented certain new and useful Improvements in Milk-Coolers, of which the following is a specification.

This invention relates to the class of milk coolers, and particularly to an apparatus or machine for agitating and aerating milk, and its novelty will be fully understood from the following description and claim when taken in connection with the annexed drawings.

The prevailing method of cooling or aerating milk, is to place the cans containing milk into a water vat, and then pump fresh water into the vat while the milk is stirred or agitated by hand. This requires unnecessary time, labor, and operation, and whether done by hand or machinery, the milk, in this manner, is only stirred in one or two cans, and then, even with two cans, the milk contained in one can, is invariably of a different temperature from that in the other can; and as to aerating one shipment of milk of equal temperature, in accordance with the said method, it is impossible. It is to overcome the aforesaid disadvantages and difficulties, that the present invention is intended.

The object of the invention is to provide means for agitating and aerating milk, contained in several, or a series of cans, at the same time, so as to bring the milk in each can to one and the same temperature or condition before shipping.

A further object of the invention is to provide means for aerating and agitating as many cans of milk at one time, and by one operation, as may be desired, and to provide means for treating milk contained in a greater or less number of cans, than is here shown, in the most simplified manner.

A still further object of the invention is to provide simple and durable means for suspending or supporting the apparatus from a milk-shed frame, and a novel means for utilizing the ordinary wind mill pump shaft to operate the apparatus.

Other objects and advantages accruing from my apparatus will be hereinafter revealed.

In the accompanying drawings, forming part of this application, Figure 1 is a perspective view of my machine in position to be operated by a windmill, the latter being partly broken away. Fig. 2 is a sectional view of one of the brackets carrying the shaft-supporting arm, showing one crosshead and the pitman connected to a pump-rod, the latter and pitman being partly broken away. Fig. 3 is a side elevation of a portion of the milk-shed ceiling having the pump-rod bearing or guide rollers secured thereto. Fig. 4 is a perspective view of the pitman. Fig. 5 is a detached view, partly broken away, of the shaft carrying the crank and cross-heads.

The same reference numerals denote the same parts throughout the several figures of the drawings.

In carrying my invention into effect, I construct upon the top 1, of a shed, a windmill 2, such shed having suitable strong corner posts 3, supporting it over a spring or other water supply, from whence water is furnished to the vat 4, by means of the pump 5.

Since nearly all farms or dairies are provided with a windmill, the latter is here employed, in conjunction with its usual purpose of operating a pump, to operate my apparatus, which is done in the following manner.

The pump rod 6, which extends through the shed roof 1, is connected at the top of the wind mill, and works through the bearing or guide rollers 7, journaled in the bracket 8, secured to the shed ceiling 9.

To the pump rod 6 is secured by bolts 10, the pitman connection 11, to which one end of the pitman 12, is secured, by means of the pin 13, having an S key 14, one end of which engages an aperture in the pin end, and the other end the lug 15, on the said connection 11; thus rendering the parts easily connected and disconnected, besides keeping said pin rigid with said connection, and preventing its rotation. The other end of the pitman has a series of crank pin holes 16, and the crank 17, has like holes 18, so that the stroke may be adjusted, as desired, in connecting the pitman and crank, which is done through the medium of the crank pin 19.

The crank 17 is adjustably secured upon the shaft 20, by means of the set screw 21, the said shaft 20, being of iron pipe, for cheapness and simplicity, while the pitman may be made of any suitable and convenient wood at hand, and tipped with irons 22 and 23.

The shaft 20, is journaled in suitable bearings 24 upon arm 25, supported by the brackets 26; the latter being bolted to the posts 3, of the shed, and upon the shaft 20, at any desired intervals, and in any number, are adjustably pivoted by set screws 30, the cross heads 27, at right angles to the crank 17; and each end of each cross head is provided with a snap-hook 28, upon which is hung an agitator 29. The connection between the agitators and the cross heads is thus simplified, so that they may be connected and disconnected as occasion may require, without the usual loss of time and labor.

It will be observed that more or less of the cross heads may be carried by the shaft 20, and more or less may be employed, in accordance with the number of cans of milk to be treated, by simply connecting or disconnecting the agitators, through the medium of the snap-hooks.

Although I have shown and described my apparatus connected to a windmill for operation, it may be just as readily adapted for operation, to a stationary engine or other similar motive power.

Having thus described my invention, what I claim as new, and desire to secure by Letters Patent, is—

In a milk cooling apparatus provided with a water vat adapted to accommodate a series of vessels containing milk, means for supplying water to the vat, the arms supported by the brackets, the shaft journaled upon the said arms, the crank adjustably secured on said shaft, a set of cross heads adjustably pivoted upon said shaft at right angles to the crank, and provided with snap hooks, the agitators connected with the snap hooks, the pitman connection, and the pitman adjustably secured at one end to the crank, and coupled at the other end to the said water supply means, substantially as shown and described.

In witness whereof I hereunto set my hand in the presence of two witnesses.

MATT C. REINERT.

Witnesses:
W. W. BRITTON,
J. H. GARRISON.